Patented Dec. 5, 1944

2,364,454

UNITED STATES PATENT OFFICE 2,364,454

CONDENSATION PRODUCTS AND METHODS OF PREPARING AND USING SAME

Eugene Lieber, West New Brighton, Staten Island, N. Y., and Harry T. Rice, Roselle, N. J., assignors to Standard Oil Development Company, a corporation of Delaware No Drawing. Application October 28, 1941, Serial No. 416,826

11 Claims. (Cl. 252—52)

This invention relates to a novel type of chemical condensation product and to methods of preparing such products and using them for various purposes, more particularly as pour depressors in waxy lubricating oils.

Broadly, the invention comprises the production of wax modifying agents by chemically condensing halogenated derivatives of abietic and related acids with aromatic compounds. This condensation is preferably carried out with the assistance of a Friedel-Crafts catalyst according to the procedure commonly used for effecting such condensations.

Abietic acid, also known as sylvic acid, is the chief constituent of American rosin. It has a molecular weight of 302 and is believed to have the structure:

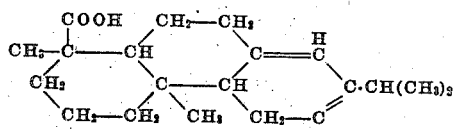

Commercial abietic acid is made by heating rosin with glacial acetic acid or with concentrated hydrochloric acid. The crude material known as "rosin" acid comprises a mixture of acids related to abietic acid, such as pimaric, sapinic and pyro-abietic. For the purposes of the present invention, it is preferred to use this commercial abietic acid as it is available in large quantity and at a relatively low cost, but for best results it is preferred to use pure abietic acid itself.

The halogenated abietic acid or so-called "rosin" acid may be prepared by treating the abietic acid with various halogenating agents such as a chloride of phosphorus and/or sulfur and these may be oxygenated or not.

A preferred method of chlorinating abietic acid consists in dissolving it in an inert chlorinated solvent such as tetrachlorethane, dichlorbenzene, etc. and adding to the resulting solution a halogenating agent such as phosphorus trichloride, $PCl_3$, or thionyl chloride, $SOCl_2$. In the case of $PCl_3$, the by-product of the reaction is phosphoric acid which, being insoluble in the chlorinated solvent, settles to the bottom of the reaction vessel and the solution of chlorinated abietic acid can thus be recovered by decantation. In the case of $SOCl_2$, the by-products of the reaction are gaseous, $SO_2$ and $HCl$, and the reaction is merely continued until the evolution of these gases has substantially subsided, whereupon the solution of chlorinated abietic acid is ready for use.

The aromatic compounds which are to be condenser with the halogenated abietic acid, according to this invention, may comprise any of the closed ring compounds, preferably hydrocarbons such as benzene, toluene, xylene, naphthalene, diphenyl ether, anthracene, phenanthrene, chrysene, fluorene, carbazole, thiophene, etc. If desired, oxygen- or nitrogen-containing derivatives of aromatic hydrocarbons may also be used such as phenol, naphthol, cresol, aniline, toluidine, naphthylamine, etc.

In carrying out the condensation of the chlorinated abietic acid, various Friedel-Crafts catalysts may be used such as aluminum chloride, zinc chloride, boron fluoride, anhydrous hydrogen fluoride and other known Friedel-Crafts condensing agents.

The proportions of the chlorinated abietic acid and the aromatic compound to be condensed together may be varied over a substantial range such as about 0.2 to 2 mols, preferably 0.5 to 1.25 mols, of abietic acid to 1 mol of aromatic compound. The Friedel-Crafts catalyst should normally be used in an amount of about 0.5 to 2.5 mols per mol of abietic acid. If a solvent is used, the amount to be used should be normally about ½–10 volumes, preferably 1–5 volumes, of solvent per volume of mixed reactants.

The preferred operating conditions for effecting the condensation reaction of this invention are to maintain the reaction temperature at about room temperature, although higher temperates can be used such as 125° F. or higher and although the use of a solvent is optional, it is preferred to use a solvent during the condensation and for this purpose a saturated kerosene, high-boiling naphtha, nitro-benzene, carbon bisulfide, tetrachlorethane, dichlorbenzene, carbon tetrachloride, chloroform, etc. may be used.

While the exact structure of the resulting condensation products is not known, they are probably ketonic in nature. However, they are not single ketones, since abietic acid contains a "conjugated" system of double bonds or unsaturation which also partake in the reaction. There are a number of possibilities; e. g., initial condensation of the carboxylic chloride (formed in the preferred chlorination procedure of the abietic acid) with the aromatic compound followed by intra-reaction with the conjugated unsaturation, thus

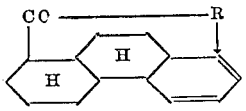

where, for simplicity, the skeletal structure of abietic acid is shown only, and R is the radical derived from the aromatic compound; or following the initial reaction an inter-molecular condensation may take place, thus

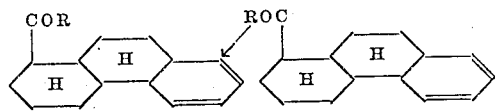

the arrows indicating the possible modes of reaction and the symbol

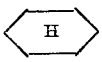

representing a hydroaromatic ring. There is also the possibility of the aromatic compound reacting initially with the conjugated unsaturation, thus:

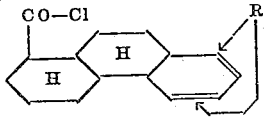

one or two R's or both can react as indicated to yield

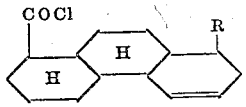

in which the R radical is an essential part of the abietic acid ring structure. Following the above the chlorine may react inter-molecularly as follows

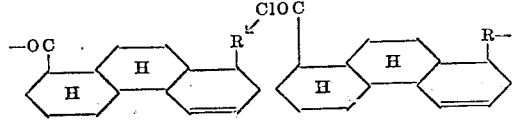

to form

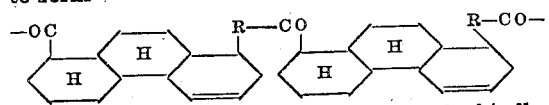

However, the above structure is undoubtedly complicated by intra-reaction taking place simultaneously. Thus

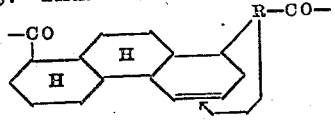

It is quite evident that the products must be very complex. However, the condensation product is soluble in mineral oils and has the property of modifying the crystal structure of paraffin wax and as such is a good pour depressor when added to waxy mineral lubricating oils in small quantities such as .05–10.0%, preferably 0.2–5.0%. A similarly small amount of this novel condensation product may be used as a dewaxing aid for removing wax from mineral lubricating oils of undesirable wax content or may be incorporated into paraffin wax or compositions containing same to be used for various purposes such as coating or impregnating paper, etc. or for making various molded products.

For the sake of illustration but without intending that the invention be limited to the particular materials used or specific reaction conditions, some experimental data are given herewith.

In the following examples, abietic acid, dissolved in tetrachlorethane as solvent, is chlorinated with phosphorus trichloride and the resulting chlorinated abietic acid is condensed with various aromatic compounds by means of aluminum chloride. The general procedure is first described and then the results of a number of tests are subsequently given in tabular form.

60 grams of abietic acid having the following properties:

Acid number _____ 169
Sap. number _____ 171
M. P. (Hercules drop method) _____C°__ 80 were dissolved in 150 cc. of tetrachlorethane as solvent and chlorinated with 20 grams of phosphorus trichloride at 80° C.–90° C. in a water bath for 60 minutes. The resulting solution of chlorinated abietic acid in tetrachlorethane was then decanted from the phosphorus acid into a mixture of 20–30 grams of the aromatic compound in 150 cc. of tetrachlorethane used as solvent. 20 to 30 grams of aluminum chloride were then slowly added to the reaction mixture in a suitable apparatus equipped with a mechanical stirrer. The reaction proceeded vigorously on each addition of aluminum chloride and the mixture was cooled so as to maintain the reaction at or about room temperature. After the addition of the aluminum chloride, the reaction mixture was maintained at room temperature for a while such as over night, and then diluted with about 500 cc. of kerosene and neutralized with an alcohol-water mixture. The kerosene extract was washed several times with the alcohol-water mixture and then distilled with fire and steam to about 600° F. in order to remove solvent and low-boiling products.

The residues of these distillations constituting the desired products of this invention are for the most part resinous in nature, are soluble in mineral oil and have good pour-depressing properties, as indicated by the test results shown in the following table. The pour point tests were made according to the standard A. S. T. M. procedure by blending 2% of the novel condensation product into a waxy mineral lubricating oil having an original pour point of +30° F. In all these tests 66 gms. of abietic acid were used.

| Test No. | Aromatic compound | | Molar ratio abietic acid/ aromatic | AlCl₃, grams | Molar ratio AlCl₃/abietic acid | Yield, grams | Pour point, °F. |
|---|---|---|---|---|---|---|---|
| | Kind | Grams | | | | | |
| 1 | Naphthalene | 39 | .72 | 28 | .965 | 31 | −5 |
| 2 | ___do___ | 50 | .56 | 50 | 1.725 | 35 | −15 |
| 3 | Acenaphthene | 31 | 1.09 | 28 | .965 | 34 | −10 |
| 4 | Aniline | 19 | 1.18 | 28 | .965 | 30 | −25 |
| 5 | Anthracene | 36 | 1.08 | 28 | .965 | 54 | +5 |
| 6 | Benzophenone | 37 | 1.08 | 28 | .965 | 20 | −20 |

The above table shows that the novel condensation products of this invention are effective pour depressors, inasmuch as 2% thereof, when added to a waxy mineral lubricating oil having a pour point of +30° F., resulted in blends having pour points ranging from +5° F. in test No. 5 to as low as −25° F. in test No. 4.

The products of this invention, when blended into natural mineral oils in various concentrations, not only depress the pour point but also impart other valuable properties thereto, such as increased oiliness and resistance to oxidation.

It is not intended that this invention be limited to any of the materials which have been given merely as specific examples but only by the appended claims in which it is intended to claim all novelty inherent in the invention, as well as equivalents coming within the scope and spirit of the invention.

We claim:

1. The process which comprises halogenating a material consisting substantially entirely of abietic acid and condensing the resultant halogenated abietic acid with a condensible aromatic compound selected from the group consisting of aromatic hydrocarbons and oxygen and nitrogen derivatives thereof, in the presence of a Friedel-Crafts catalyst, hydrolyzing and removing the catalyst, and distilling the condensation products to obtain a substantially non-volatile distillation residue having pour-depressing properties.

2. The process which comprises chlorinating a material consisting substantially entirely of abietic acid and chemically condensing the resultant chlorinated abietic acid with a condensible aromatic compound selected from the group consisting of hydrocarbons and oxygen and nitrogen derivatives thereof, in the presence of a chlorinated hydrocarbon solvent and in the presence of aluminum chloride as catalyst, at a reaction temperature between the approximate limits of room temperature and 200° F., hydrolyzing and removing the catalyst and distilling the condensation products with fire and steam up to about 600° F. to obtain the desired distillation residue.

3. The process which comprises chlorinating a material consisting substantially entirely of abietic acid with phosphorus trichloride, dissolving the resultant chlorinated abietic acid in tetrachlorethane containing dissolved therein a condensible aromatic compound selected from the group consisting of aromatic hydrocarbons and oxygen and nitrogen derivatives thereof, and slowly adding aluminum chloride to the resultant mixture with stirring, maintaining the reaction mixture at a temperature not substantially above room temperature until the reaction has substantially subsided, diluting the resulting reaction mixture with an inert diluent, hydrolyzing or neutralizing and removing the catalyst, and distilling the condensation products with fire and steam to about 600° F. to remove solvent and low-boiling products to obtain the desired distillation residue.

4. A resinous Friedel-Crafts condensation product of a material consisting substantially entirely of chlorinated abietic acid and a condensible aromatic compound selected from the group consisting of aromatic hydrocarbons and oxygen and nitrogen derivatives thereof, said product being soluble in mineral oil, and substantially non-volatile at temperatures up to 600° F.

5. A composition comprising a major proportion of a wax-containing petroleum fraction and a small amount of a Friedel-Crafts condensation product of halogenated abietic acid and an aromatic compound selected from the group consisting of aromatic hydrocarbons and oxygen and nitrogen derivatives thereof.

6. A lubricant comprising a major proportion of a lubricating oil and a small amount of a Friedel-Crafts condensation product of chlorinated abietic acid and an aromatic compound selected from the group consisting of aromatic hydrocarbons and oxygen and nitrogen derivatives thereof.

7. A lubricant comprising a major proportion of a waxy mineral lubricating oil and a small but pour-depressing amount of a condensation product made according to the process defined in claim 3.

8. A lubricant comprising a major proportion of waxy mineral lubricating oil and a small but pour-depressing amount of a resinous Friedel-Crafts condensation product of chlorinated abietic acid and an aromatic compound selected from the group consisting of aromatic hydrocarbons and oxygen and nitrogen derivatives thereof, said condensation product being soluble in said lubricating oil and being substantially non-volatile at temperatures up to about 600° F. under fire and steam distillation.

9. Lubricant according to claim 8 in which the aromatic compound condensed with the chlorinated abietic acid is naphthalene.

10. Lubricant according to claim 8 in which the aromatic compound condensed with the chlorinated abietic acid is aniline.

11. Process according to claim 3 in which the aromatic compound used is naphthalene.

EUGENE LIEBER.
HARRY T. RICE.